United States Patent Office

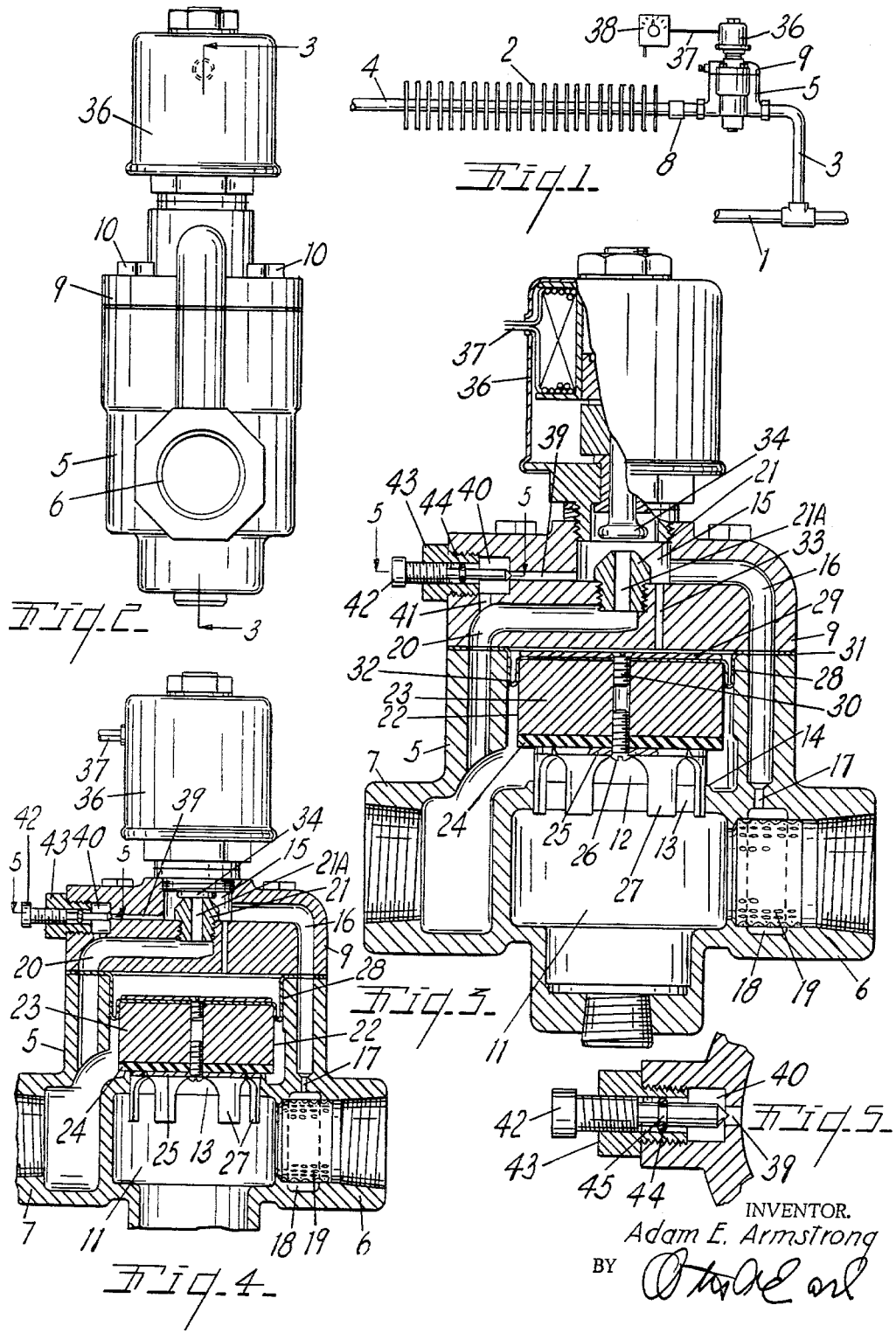

3,253,615
Patented May 31, 1966

3,253,615
VALVE ASSEMBLY
Adam E. Armstrong, Three Rivers, Mich., assignor to Armstrong Machine Works, Three Rivers, Mich.
Filed Oct. 16, 1963, Ser. No. 316,562
8 Claims. (Cl. 137—599)

This application is a continuation-in-part of application for patent, Serial No. 192,203, filed May 3, 1962, and now abandoned.

This invention relates to improvements in valve assemblies for use in heating systems and the like. The main objects of this invention are:

First, to provide a valve assembly adapted for use in heating systems or the like and which is controllable by a remotely located thermostat.

Second, to provide a valve assembly which is adapted for such uses and is a unitary structure and may be readily installed in heating systems of different types.

Third, to provide a valve assembly having these advantages in which the main or circulating valve opens and closes with little or no sound.

Fourth, to provide a valve assembly having these advantages in which the main casing parts may be formed of castings and readily assembled and disassembled as occasion may require.

Objects relating to details and economies of the invention will appear from the description to follow. The invention is defined and pointed out in the claims.

A preferred embodiment of the invention is illustrated in the accompanying drawing, in which:

FIG. 1 is a fragmentary view of a heating apparatus embodying my invention, parts of the heating system being shown conventionally.

FIG. 2 is an enlarged side view of the embodiment of my invention illustrated in FIG. 1.

FIG. 3 is an enlarged fragmentary view partially in vertical section on a line corresponding to line 3—3 of FIG. 2 with the valves in open position.

FIG. 4 is a corresponding fragmentary view mainly in section with the valves in closed position.

FIG. 5 is an enlarged fragmentary view partially in section on a line corresponding to line 5—5 of FIGS. 3 and 4.

The embodiment of my invention illustrated is adapted for various uses but I have illustrated in the accompanying drawing its embodiment in a heating system. It comprises a main conduit 1, a radiator shown conventionally at 2, an inlet pipe or connection 3 for the radiator and an outlet connection 4. These parts are conventionally shown and they do not form part of my present invention but they are illustrated to show one commercial adaptation of my invention.

In the embodiment of my invention illustrated, the control unit comprises the casing member 5 having an inlet 6 to which the conduit 3 is connected and an outlet 7 to which the radiator 2 is connected by the coupling means 8. The second casing member 9 constitutes a top for the first casing member 5 and is connected thereto by the bolts or screws conventionally illustrated at 10.

The inlet 6 delivers to an inlet chamber 11 connected to the valve chamber 12 by the port 13 which is surrounded on its upper side by an annular upwardly facing valve seat 14. This valve chamber 12 is connected, or opens, to the outlet 7. The second casing member 9 constitutes the top wall for the valve chamber 12.

The casing member 9 is provided with a control valve chamber 15 connected by the passage 16 to the inlet 6, this conduit 16 having a reduced inlet portion 17 opening to the annular channel 18 surrounding the inlet 6. Desirably an annular screen 19 is provided for this channel 18.

The first and second casing members are provided with an outlet passage 20 formed in the walls of the first and second casing members and discharging into the outlet 7. The passage 20 is connected to the valve chamber 15 by means of a port or passage 21A in the valve seat member 21.

The valve chamber above the valve seat 14 is of a diameter exceeding that of the valve seat.

The main valve 22 comprises a cylindrical body portion 23 of a diameter exceeding that of the valve seat 14 and having a disk-like resilient valve engaging face member 24 disposed on its underside and secured thereto by the disk 25 and the screw 26 which is disposed through the disk and the valve face member to clampingly secure the valve face member to the valve body member with portions of the valve face member projecting beyond the periphery of the disk 25 to sealingly engage the valve seat 14 when the valve is in closed position, as is illustrated in FIG. 4. This flexible or yielding valve facing member 24 is supported throughout by the body portion 23 of the valve. The member 25 is provided with a plurality of laterally spaced downwardly projecting guide members 27 which are slidably engaged in the port 13; see the open and closed positions of the valve in FIGS. 3 and 4.

The automatic control means for this main valve include a flexible diaphragm designated 28. This diaphragm is disposed on the upper end of the body portion 23 of the valve and is secured thereto by the disk-like clamping member 29 disposed thereon and secured to the body member by the screw 30. The outer edge 31 of the diaphragm is disposed between the first and second casing members as is illustrated. The casing members not only constitute supporting means for the diaphragm but the diaphragm serves as a gasket for these casing members "first" and "second" or "main and second casing members."

The diaphragm is provided with an annular downwardly projecting bellows-like looped portion 32 which surrounds a substantial portion of the body member 23 providing means for dividing the valve chamber 12, in effect, into upper and lower sections, the upper section being connected to the control valve chamber 15 by the restricted conduit 33, the purpose of which will appear as the description proceeds.

The control valve 34 coacts with the valve seat member 21 at the outer end of the passage 21A and this control valve 34 is controlled by an electro-magnetic control unit designated generally by the numeral 36 which is connected by the connection 37 to the thermostat unit 38. This thermostat unit is shown conventionally but details of the electro-magnetic control unit are not shown other than to indicate the cooperating relation thereof with the valve 34.

In the embodiment illustrated, this control valve unit constitutes a closure for the outer end of the control valve chamber 15.

The passage 33 transmits inlet pressure from the inlet connection 6 through restricted passage 17, passage 16 and control valve chamber 15 to the upper section of the main valve chamber above the diaphragm 28. The area of the top of main valve body portion 23 being greater than the area of resilient valve facing within the outline of valve seat 14, the inlet pressure transmitted through passage 33 holds the main valve 22 closed even though the same inlet pressure is present in inlet valve chamber 11 from the inlet 6, but acting on the smaller area within the seat 14. The lower section of the main valve chamber 12 below the diaphragm 28 is at low outlet pressure due to its communication with the outlet 7.

When valve 34 is opened by operation of the thermostat and magnetic control 36 so that low outlet pressure existing in outlet 7, passage 20 and valve passage 21A is established in control valve chamber 15. More accurately, the high pressure in control valve chamber 15 escapes through valve passage 21A faster than it can be replaced or maintained through restricted passage 17. This relieves the high pressure existing in passage 33 and in the upper section of main valve chamber 12 so that high pressure in the inlet valve chamber 11 opens main valve 22, 24. Raising of valve body 22 and diaphragm 28 expels most of the steam from the upper section of the main valve chamber and closes off the lower end of passage 33. The restricted size of passage 33 slows or dampens this action.

Closing of magnetic control valve 34 permits the build up of high pressure in control valve chamber 15 to act through port 33 and close the main valve.

Previous valves of this type have operated rapidly with objectionable noise caused by opening and closing motion of the main valve member unless some cushioning or dash pot structure was connected to the main valve. The present invention eliminates the need for such cushioning or dash pot structure by providing an auxiliary bleed passage 39 and 41 from the control valve chamber 15 in the upper casing 9 to the passage 20 and the main valve body to the outlet 7. An adjustable needle valve 42 in the upper casing controls the opening of the passage through a chamber 40.

With this bleed passage, part of the high inlet pressure in the control valve chamber 15 is continuously bled off to the outlet so the pressure applied through passage 33 to the top of the main valve 22 is not so high and the pressure differential between the opposite faces of valve 22 is not changed so much when control valve 34 opens. Consequently valve 22 does not move open so rapidly or with as great a noise as it reaches open position.

When control valve 34 closes, the high inlet pressure in control valve chamber 15 does not build up so fast or so high and the main valve closing pressure transmitted through passage 33 is somewhat lower and slower in overcoming the inlet pressure on the lower side of valve 22 so the valve closes more gently and with less noise.

Further, some steam always by-passes the main valve 22 through the adjustable bleed valve passages 39, 40 and 41 so the thermostat 38 does not operate so frequently. Where the heat demand in the room is low and fairly constant the valve 42 can be adjusted so that main valve 22 less frequently operates, and then with a slower, less noisy action. Further, the continuous flow of a small quantity of steam through passage 16 and the second casing member reduces, if not entirely prevents, condensation of steam in control chamber 15 and collection of water in the main valve chamber above the diaphragm 28.

The valve 42 is adjustably threaded through a supporting nut 43 threaded into the cap 9. An O-ring gasket 44 in a groove 45 in the stem of the valve seals the valve in its bore in the nut.

This valve which I have designated as a "by-pass valve" does allow restricted flow through the second valve chamber but it should be understood that the apparatus may be used with this by-pass valve completely closed, or omitted.

I have illustrated and described my invention in a highly practical commercially desirable embodiment thereof. I have illustrated an installment thereof in a heating system but it is adapted to be installed in various relations. I have not attempted to illustrate or describe these various relations or adaptations or possible modifications as it is believed that this disclosure will enable those skilled in the art to embody or adapt my invention as may be desired.

Having thus described the invention, what is claimed as new and desired to be secured by Letters Patent is:

1. A valve assembly comprising a first casing member having inlet and outlet conduit openings and inlet and main valve chambers connected by a port surrounded by an upwardly projecting valve seat, said main valve chamber being cylindrical and of a diameter exceeding that of said valve seat, a second casing member detachably mounted on said first casing member and constituting a top for said main valve chamber and having a control valve chamber therein, said first and second casing members having a passage therein connecting said control valve chamber to said inlet, a main valve comprising a cylindrical body portion of a diameter exceeding that of said valve seat and having a disk-like resilient valve seat engaging face member disposed on its underside, a valve guide and support member for said valve face member disposed on the underside thereof with its outer edge in inwardly spaced relation to the outer edge of said valve face member and having laterally spaced downwardly projecting spaced portions slidably engaging said port, a flexible diaphragm having a portion disposed on the upper end of said main valve, a clamping disk for said diaphragm of a diameter substantially corresponding to that of said main valve body member and fixedly secured thereto, said diaphragm having an outer portion supportedly disposed between and constituting a gasket for said first and second casing members and having a downwardly projecting looped portion disposed between said main valve body portion and the side wall of said main valve chamber, a control valve seat member mounted on said second casing member and having a passage therein connecting said control valve chamber to said outlet conduit opening, there being a passage connecting said control valve chamber to said main valve chamber at the opposite side of said diaphragm from said main valve body, an electro-magnetic control unit detachably mounted on said second valve casing member and constituting a closure for said second valve chamber outlet, and a control valve coacting with said second valve seat and operatively connected to said electro-magnetic unit to be actuated thereby.

2. A valve assembly comprising a first casing member having inlet and outlet conduit openings and inlet and main valve chambers connected by a port surrounded by an upwardly projecting valve seat, said main valve chamber being cylindrical and of a diameter exceeding that of said valve seat, a second casing member detachably mounted on said first casing member and constituting a top for said main valve chamber and having a control valve chamber therein, said first and second casing members having a passage therein connecting said control valve chamber to said inlet, a main valve comprising a cylindrical body portion of a diameter exceeding that of said valve seat and having a disk-like resilient valve seat engaging face member disposed on its underside, a flexible diaphragm having a portion disposed on the upper end of said main valve, a clamping disk for said diaphragm of a diameter substantially corresponding to that of said main valve body member and fixedly secured thereto, said diaphragm having an outer portion supportedly disposed between and constituting a gasket for said first and second casing members and having a downwardly projecting looped portion disposed between said main valve body portion and the side wall of said main valve chamber, a control valve seat member mounted on said second casing member and having a passage therein connecting said control valve chamber to said outlet conduit opening, there being a passage connecting said control valve chamber to said main valve chamber at the opposite side of said diaphragm from said main valve body, an electro-magnetic control unit detachably mounted on said second valve casing member and constituting a closure for said control valve chamber outlet, and a control valve coacting with said control valve seat and operatively connected to said electro-magnetic unit to be actuated thereby.

3. A valve assembly comprising a first casing member having inlet and outlet conduit openings and inlet and main valve chambers connected by a port surrounded by an upwardly projecting valve seat, said main valve chamber being cylindrical and of a diameter exceeding that of said valve seat, a second casing member detachably mounted on said first casing member and constituting a top for said main valve chamber and having a control valve chamber therein, said first and second casing members having a passage therein connecting said control valve chamber to said inlet, a main valve comprising a cylindrical body portion of a diameter exceeding that of said valve seat and having a disk-like resilient valve seat engaging face member disposed on its underside, a flexible diaphragm having a portion disposed on the upper end of said main valve, a clamping disk for said diaphragm of a diameter substantially corresponding to that of said main valve body member and fixedly secured thereto, said diaphragm having an outer portion supportedly disposed between and constituting a gasket for said first and second casing members and having a downwardly projecting looped portion disposed between said main valve body portion and the side wall of said main valve chamber, a control valve seat member mounted on said second casing member and having a passage therein connecting said control valve chamber to said outlet conduit opening, there being a passage connecting said control valve chamber to said main valve chamber at the opposite side of said diaphragm from said main valve body, a vent passage connecting said control valve chamber to said outlet, an adjustable regulating valve for said vent passage, an electro-magnetic control unit detachably mounted on said second valve casing member and constituting a closure for said control valve chamber, and a control valve coacting with said control valve seat and operatively connected to said electro-magnetic unit to be actuated thereby.

4. A value assembly comprising a first casing member having inlet and outlet conduit openings and a main valve chamber connected to said inlet by a port surrounded by an upwardly facing valve seat, said main valve chamber being cylindrical and of a diameter exceeding that of said valve seat, a second casing member detachably mounted on said first casing member and constituting a top for said main valve chamber and having a control valve chamber therein, said first and second casing members having a passage therein connecting said control valve chamber to said inlet, a main valve comprising a cylindrical body portion of a diameter exceeding that of said valve seat and having a valve seat engaging face on its underside, a guide for said main valve disposed on the underside thereof and having downwardly projecting laterally spaced portions slidably engaging said port, a flexible diaphragm connected to said main valve and to said casing and having a downwardly projecting looped portion disposed between said main valve body portion and the side wall of said main valve chamber, there being a passage connecting said control valve chamber to said main valve chamber at the opposite side of said diaphrgam from said main valve body, said first and second casing members having an outlet passage therein connecting said control valve chamber with said outlet conduit opening, an electro-magnetic control unit detachably mounted on said second valve casing member and constituting a closure for said control valve chamber, and a control valve coacting with said control chamber outlet and operatively connected to said electromagnetic unit to be actuated thereby.

5. A valve assembly comprising a first casing member having inlet and outlet conduit openings and a main valve chamber connected to said inlet by a port surrounded by an upwardly facing valve seat, said main valve chamber being cylindrical and of a diameter exceeding that of said valve seat, a second casing member detachably mounted on said first casing member and constituting a top for said main valve chamber and having a control valve chamber therein, said first and second casing members having a passage therein connecting said control valve chamber to said inlet, a main valve comprising a cylindrical body portion of a diameter exceeding that of said valve seat and having a valve seat engaging face on its underside, a flexible diaphragm connected to said main valve and to said casing and having a downwardly projecting looped portion disposed between said main valve body portion and the side wall of said main valve chamber, there being a passage connecting said control valve chamber to said main valve chamber at the opposite side of said diaphragm from said main valve body, said first and second casing members having an outlet passage therein connecting said control valve chamber with said outlet conduit opening, an electro-magnetic control unit detachably mounted on said second valve casing member and constituting a closure for said control valve chamber, and a control valve coacting with said control valve chamber outlet and operatively connected to said electro-magnetic unit to be actuated thereby.

6. A valve assembly comprising a first casing member having inlet and outlet conduit openings and a main valve chamber connected to said inlet by a port surrounded by an upwardly facing valve seat, said main valve chamber being cylindrical and of a diameter exceeding that of said valve seat, a second casing member detachably mounted on said first casing member and constituting a top for said main valve chamber and having a control valve chamber therein, said first and second casing members having a passage therein connecting said control valve chamber to said inlet, a main valve comprising a cylindrical body portion of a diameter exceeding that of said valve seat and having a valve seat engaging face on its underside, a flexible diaphragm connected to said main valve and to said casing and having a downwardly projecting looped portion disposed between said main valve body portion and the side wall of said main valve chamber, there being a passage connecting said control valve chamber to said main valve chamber at the opposite side of said diaphragm from said main valve body, said first and second casing members having an outlet passage therein connecting said control valve chamber with said outlet conduit opening, a vent passage connecting said control valve chamber to said outlet conduit opening, an adjustable regulating valve for said vent passage, an electro-magnetic control unit detachably mounted on said second valve casing member and constituting a closure for said control valve chamber, and a control valve coacting with said control valve chamber outlet passage and operatively connected to said electro-magnetic unit to be actuated thereby.

7. A valve assembly comprising a casing having an inlet and an outlet and a cylinder-like main valve chamber of substantial length connected to said inlet by a port surround by a rearwardly facing valve seat, said main valve chamber being cylindrical and of a diameter exceeding that of said valve seat, said casing having a control valve chamber and having a passage therein connecting said control valve chamber to said inlet and a passage connecting said control valve chamber to said outlet, said passages being connected by an outlet port for said control valve chamber, a main valve comprising a cylindrical body portion of a diameter exceeding that of said valve seat and having a valve seat engaging face on its underside, a guide for said main valve disposed on the underside thereof and having downwardly projecting valve guide portions slidably engaging said inlet port, a flexible diaphragm connected to said main valve and to said casing and having a downwardly projecting bellows fold portion disposed between said main valve body portion and the side wall of said main valve chamber, there being a restricting flow passage connecting said control valve chamber to said main valve chamber at the opposite side of said diaphragm from said main valve body, a vent passage connecting said control valve chamber to said outlet, an adjustable flow regulating valve for said vent passage, a control valve for said port for said control valve chamber outlet, and automatic control means for said control valve.

8. A valve assembly comprising a casing having an inlet and an outlet and a main valve chamber of substantial length connected to said inlet by a port surrounded by a rearwardly facing valve seat, said main valve chamber being of diameter exceeding that of said valve seat, said casing having a control valve chamber and having a passage therein connecting said control valve chamber to said inlet and a passage connecting said control valve chamber to said outlet, said passages being connected by an outlet port for said control valve chamber, a main valve comprising a cylindrical body portion of a diameter exceeding that of said valve seat and having a valve seat engaging face on its underside, a flexible diaphragm connected to said main valve and to said casing and having a downwardly projecting bellows fold portion disposed between said main valve body portion and the side wall of said main valve chamber, there being a restricting flow passage connecting said control valve chamber to said main valve chamber at the opposite side of said diaphragm from said main valve body, a vent passage connecting said control valve chamber to said outlet, an adjustable flow regulating valve for said vent passage, a control valve for said port for said control valve chamber outlet, and automatic control means for said control valve.

References Cited by the Examiner
UNITED STATES PATENTS

| | | | |
|---|---|---|---|
| 2,146,878 | 2/1939 | Abrogast | 251—43 X |
| 2,148,383 | 2/1939 | Tyden | 251—46 |
| 2,664,916 | 1/1954 | Conley | 251—30 X |
| 2,902,052 | 9/1959 | Ohlsson | 137—625.27 X |
| 2,991,796 | 7/1961 | Griswold | 251—50 X |
| 3,112,094 | 11/1963 | Nees et al. | 251—46 X |

MARTIN P. SCHWADRON, *Acting Primary Examiner.*

M. CARY NELSON, A. ROSENTHAL,
*Assistant Examiners.*